United States Patent
Bharthulwar et al.

(10) Patent No.: US 7,689,862 B1
(45) Date of Patent: Mar. 30, 2010

(54) APPLICATION FAILOVER IN A CLUSTER ENVIRONMENT

(75) Inventors: Aparna Bharthulwar, Longmont, CO (US); Odell Walker, Jr., Aurora, CO (US)

(73) Assignee: EMC Corporation, Hopkinton, MA (US)

( * ) Notice: Subject to any disclaimer, the term of this patent is extended or adjusted under 35 U.S.C. 154(b) by 509 days.

(21) Appl. No.: 11/626,186

(22) Filed: Jan. 23, 2007

(51) Int. Cl.
*G06F 11/00* (2006.01)

(52) U.S. Cl. .............................. 714/13; 714/4
(58) Field of Classification Search .............. 714/4, 714/11, 13
See application file for complete search history.

(56) References Cited

U.S. PATENT DOCUMENTS

| | | | |
|---|---|---|---|
| 6,360,331 B2 * | 3/2002 | Vert et al. ....................... 714/4 |
| 6,857,082 B1 * | 2/2005 | Josan et al. ...................... 714/4 |
| 6,993,566 B2 * | 1/2006 | Davis et al. .................. 709/213 |
| 7,010,717 B2 * | 3/2006 | Whitlow ......................... 714/4 |
| 2005/0097394 A1 * | 5/2005 | Wang et al. .................... 714/11 |
| 2005/0268156 A1 * | 12/2005 | Mashayekhi et al. ........... 714/4 |
| 2006/0015773 A1 * | 1/2006 | Singh et al. .................... 714/13 |
| 2006/0080569 A1 * | 4/2006 | Sciacca ......................... 714/4 |
| 2007/0006015 A1 * | 1/2007 | Rao et al. ....................... 714/4 |
| 2009/0070623 A1 * | 3/2009 | Sciacca ......................... 714/4 |

* cited by examiner

*Primary Examiner*—Marc Duncan
(74) *Attorney, Agent, or Firm*—Workman Nydegger

(57) ABSTRACT

Cluster unaware application failover in a clustered environment. A cluster typically includes a shared disk and at least two nodes referred to as an "active node" where the application is processed, and a "passive node" capable of processing the application in the event of an "active node" failure. The method includes identifying active node failures using a cluster manager, activating application resources from the shared disk, transferring the application resource services to the passive node, and processing the application from the passive node.

22 Claims, 7 Drawing Sheets

APPLICATION FAILOVER IN A CLUSTER ENVIRONMENT

CROSS-REFERENCE TO RELATED APPLICATIONS

Not applicable.

BACKGROUND OF THE INVENTION

1. The Field of the Invention

The present invention relates to the field of distributed software applications. More particularly, embodiments of the invention relate to the process of failover in a cluster-unaware application operating in a clustered environment.

2. The Relevant Technology

The world is slowly and continually moving from being paper-based to being electronic-based. This evolution is apparent in almost every aspect of life, from the workplace, to government institutions, to home life. In each area, old paper-based methods of communication and storage are being replaced by electronic information. Businesses have replaced bulky paper files and expensive storage rooms with electronic files and searchable databases. Tax-payers are encouraged to submit returns electronically rather than in paper form, and email is rapidly becoming a principal form of communication.

There are several reasons for this transition, one of which is the convenience and accessibility of electronic systems. Email, for example, often arrives shortly after sending it, and information submitted electronically can be quickly formatted, processed, and stored without the inconvenience of manually reviewing each submission by hand.

As companies and personal users rely more and more on computers to store important information, there is an ever-increasing need for protection against hardware or software failure. As many a disappointed computer user can attest, a single failure can result in days or weeks of unplanned downtime and the loss of crucial information. Particularly for businesses, disrupted operations and unplanned downtime can result in decreased profitability. Due to these concerns, many business and consumers are taking measures to plan for and recover from hardware and software failure failures and other disasters that may affect their data.

One strategy of recovering from hardware and/or software failures is clustering, where computer systems and storage devices are interconnected within a local data center. Typically, such systems utilize a high speed connection, to ensure an almost instantaneous transfer of data between two devices in case of failure. Such clustering is used for various reasons, including increased reliability, availability, serviceability, and performance.

Clusters generally use local area networks and redundant interconnections. Using these connections, clusters can appear as a single, highly available system. Often the computer systems within a cluster, or nodes, use a common pool of storage devices, and the purpose of the cluster is to provide an alternative processing resource for the data on the shared storage devices in case of a failure in one of the computer systems or nodes.

Typically, each clustered computer system runs special software to coordinate the activities of the computer systems in the cluster, such as Microsoft Cluster Software™. Such software is referred to herein as a cluster manager. A cluster manager generally maintains a series of constant communication between the cluster nodes through the exchange of periodic messages called "heartbeats." Additionally, if one of the nodes becomes unavailable as a result of failure or scheduled maintenance, the cluster manager instructs another node to begin providing service through a process called failover. Advantageously, this operation is generally transparent to the user since the applications and data running continue to be available through the use of the other nodes.

Cluster-aware applications are designed specifically for use in a clustered environment. Cluster aware applications are aware of other nodes and communicate with them. Conversely, many applications are cluster-unaware, meaning that the applications do not know if they are running in a cluster or on a single node. The existence of a cluster is completely transparent for cluster unaware applications. As a result, additional software and configuration is needed in order to successfully operate the application in a cluster. In fact, configuring cluster unaware applications for use in a clustered environment is an extremely technical process, requiring extensive trial and error in order to ensure that the applications are operating appropriately. There is therefore a need for systems and methods for configuring a cluster unaware application in a clustered environment and for failing over a cluster unaware application when a node fails. In other words, systems and methods are needed that can enable a cluster unaware application take advantage of the benefits that are associated with a clustered environment.

BRIEF SUMMARY OF THE INVENTION

These and other limitations are overcome by embodiments of the invention, which relate to systems and methods for configuring failover of a cluster-unaware application in a clustered environment and to failover of the cluster unaware application. Application failover according to embodiments of the present invention enables an application to operate more efficiently and reliably within a series of networks.

Embodiments of the invention relate to failover of a cluster-unaware application in a clustered environment. The process of failover often begins with the failure of the active node and then failing over the appropriate processes over to the passive node. During failover, the processes are identified using the registry key locations corresponding to each process.

In some embodiments, configuring the hardware and software components of the system is first performed in anticipation of failover. This ensures that the appropriate processes of the application are identified by the nodes of the cluster during failover.

For example, the cluster unaware application may be a file migration software application, capable of transferring files from a file server to a backup location. Following successful installation and configuration of the application, the application will be capable of failover even when the application is cluster unaware, thereby providing a high availability solution for many applications that are not specifically designed to operate in a clustered environment.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
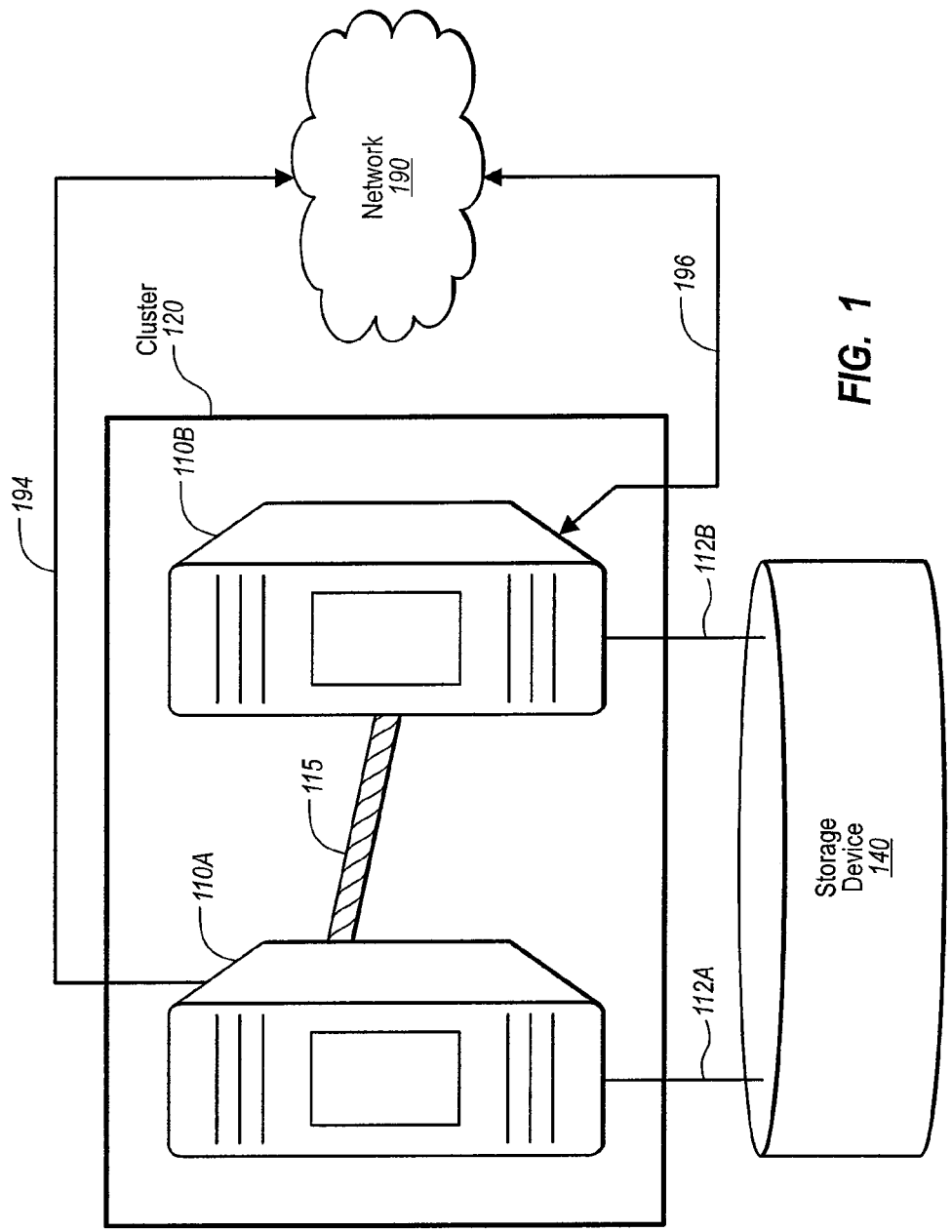
FIG. 1 illustrates one embodiment of a clustered environment capable of performing failover for a cluster unaware application.

In the following detailed description, reference is made to the accompanying drawings, and in which are shown by way of illustration embodiments in which the invention may be practiced. It is to be understood that other embodiments may be utilized and structural changes may be made without departing from the scope of the present invention.

Cluster computing environments typically operate by having redundant computer systems or nodes which are then used to provide services when system components fail. Embodiments of the invention relate to methods and systems for enabling high availability and failover in a cluster-unaware application in a computer system. High availability in a clustered environment is often implemented for the purpose of improving the availability of services which the cluster provides.

Normally, if a server with a particular application crashes, the application will be unavailable until someone manually fixes the crashed server. High-availability clusters, however, remedy this situation by detecting hardware/software failures and immediately starting the application on another system without requiring human intervention through a process called failover. This process is often transparent to the user and the user does not experience any loss of data or note that a failure has occurred.

Several applications have been written that support the cluster API. These applications are referred to as "cluster-aware" and are able to register with the cluster manager during or after their installation and may receive status and notification information and may use the cluster API to administer to clusters.

Applications that do not support the cluster API are defined as "cluster-unaware." While not specifically designed to operate in a clustered environment, may applications may still be used in a cluster if the applications meet certain criteria. In order to run in a high-availability cluster environment, an application should typically satisfy at least the following technical requirements:

There should be a relatively easy way to start, stop, force-stop, and check the status of the application. In practical terms, this often means that the application must have a command line interface or scripts controlling the application, including support for multiple instances of the application. Further, the application must not corrupt data if it crashes or restarts from the saved state.

The application should be able to specify where the application data is stored. Further, the application must store its data in a configurable location that is attached to each of the nodes, meaning that the application may be using shared storage such as NAS or SAN.

The application should use an IP based protocol (such as TCP, UDP, DCOM, Named Pipes or RPC over TCP/IP, or the like) for the network communications to run on a cluster server.

In one embodiment, these requirements are satisfied. In addition, the cluster can be configured appropriately in order to support failover in the cluster unaware application. Embodiments of the invention relate to systems and methods of failover of a cluster-unaware application in a clustered environment.

FIG. 1 illustrates one embodiment of a system 100 for a high-availability cluster, and one of ordinary skill in the art will recognize that similar systems can be used for configuring other types of resources or for other embodiments of the invention. According to this embodiment two nodes 110A and 110B are connected within the cluster system. A cluster may include more than two nodes, and embodiments are not limited to a maximum number of nodes in a cluster. In this example, node 100A shares a common storage device 140 with node 110B. Node 110A is interconnected with the storage device 140 via a connection 112A, and node 110B is interconnected with storage resource 140 via interconnection 112B.

Storage device 140 is shown as a local storage device, although storage for a cluster may also be accessed through a network (LAN, WAN, and the like). For example, storage device 140 may comprise a storage device managed by a storage server on a storage area network. Also, the storage device 140 may include intelligent and/or non-intelligent storage arrays. Further, storage accessed through a network can be viewed as connected with both node 110A and node 110B.

According to one embodiment, nodes 110A and 110B are configured as servers for the same application. Nodes in a cluster can be connected to shared storage, such as fibre channel or Small Computer System Interface (SCSI) RAID arrays, via a separate fibre switch using redundant cables. The cluster communication 115 connects nodes 110A and 100B of the cluster 120. The cluster communication 115 is shown as a heartbeat private network connection via crossover cables between redundant network interface cards (NICs) when two nodes form the cluster. When more than two nodes form the cluster, the private network connection 115 may be implemented as a common storage area shared by the nodes of the cluster 120. Heartbeat data can be written to the common storage area and read whenever the status of nodes in the cluster is checked.

The private network provided via the cluster communication 115 enables failover software in the cluster manager to recognize when a system or process has failed. Typically, redundant power sources are also included in the event of a power failure. In most computer systems, clusters also have redundant public network connections, such as connections 194 and 196 to network 190, to communicate via a network such as a local area network, wide area network, or the Internet.

One aspect of the failover of a cluster unaware application may include the configuration of the cluster including the configuration of the nodes in the cluster. Part of the configuration process includes defining cluster resources that can be shared in each of the nodes for a cluster unaware application. Defining cluster resources may involve logging into the cluster management software in the active node 110A, creating a new resource, naming the resource, defining resource properties, listing preferred owners, and the like. An example of a common resource that may need to be created for the application are Virtual IP addresses that allow the application to connect to a common IP address, regardless of which node the application is operating from. Defining resources can be performed automatically or by a user.

One skilled in the art will understand that additional cluster resources may be created based on the type of application to be installed. For instance, a storage management application may require the creation of a cluster resource for the application database as well as a resource for the application server. Examples of specific cluster resources necessary to enable failover in an exemplary application are discussed below.

After defining cluster resources, registry key locations for each defined application resource are identified. This action enables the cluster manager to recognize the application's process and to transfer the processes between nodes 110A and 110B during failover. Identifying or defining registry key locations can be performed automatically or manually by a user.

For example, registry locations can be defined as follows
1. Select New Resource from the File menu in the Cluster Administrator.
2. In the New Resource Wizard:
   a. Type Application Server in the Name text box.
   b. Select Generic Service from the Resource Type list.
   c. Select Cluster Group from Group list, and click Next.
   d. Add both the active node 310A and the passive node 310B to the Possible Owners list, and click Next.
   e. From the Available resources column, select All Available Resources and click Add to move them to the Resource dependencies column, and then click Next.
   f. Type Application Server in the Service Name text box, and click Next.
   g. Set the Start parameters for the Application Database service:
      1. Open the Windows Services application.
      2. Right-click the Application Server service to display the Application Server Properties dialog box.
      3. Copy the entry from the Path to executable entry into the Start Parameters text box, and then click Next.
      4. Paste the Path to executable entry into the Start parameters text box, and then click Next.
   h. Click Add (next to the Registry Replication field) and type:
      SYSTEM\CurrentControlSet\Services\Application Server
   i. Click Finish.

The above process can be different as will be evident to one of skill in the art with the benefit of this disclosure. Further, other resources such as a Virtual IP service, an Application Server Service, or an Application database service can be similarly configured on the nodes in a cluster environment.

Next, the application is installed on the shared disk either automatically or by a user. In many cluster unaware applications, installation of the application requires certain installation procedures for installing the application on a shared disk. During this process, for example, it is advantageous to have only one node operating while installing the application. For example, during installation or configuration of a node 110A, the other node 110B should be placed in shutdown mode.

Further, installation of the application on shared disk preferably occurs while the other nodes are placed in shutdown mode. As previously mentioned a computer system may have several nodes. During the installation process for node 110A, an installation directory on the shared disk 140 is created.

After installation on node 110A is completed, the active node 110A is shut down and the passive node 110B is restarted. Then the node 110B is configured similarly to the node 110A and the application is then installed on the shared directory for the passive node 110B. This process should be repeated for each node in the cluster 120. If necessary, a client side aspect of the application can be installed on any clients.

Once this process is completed, the cluster unaware application is successfully installed in a cluster environment and failover, as described in more detail below, can occur for a cluster unaware application.

Figure 2:
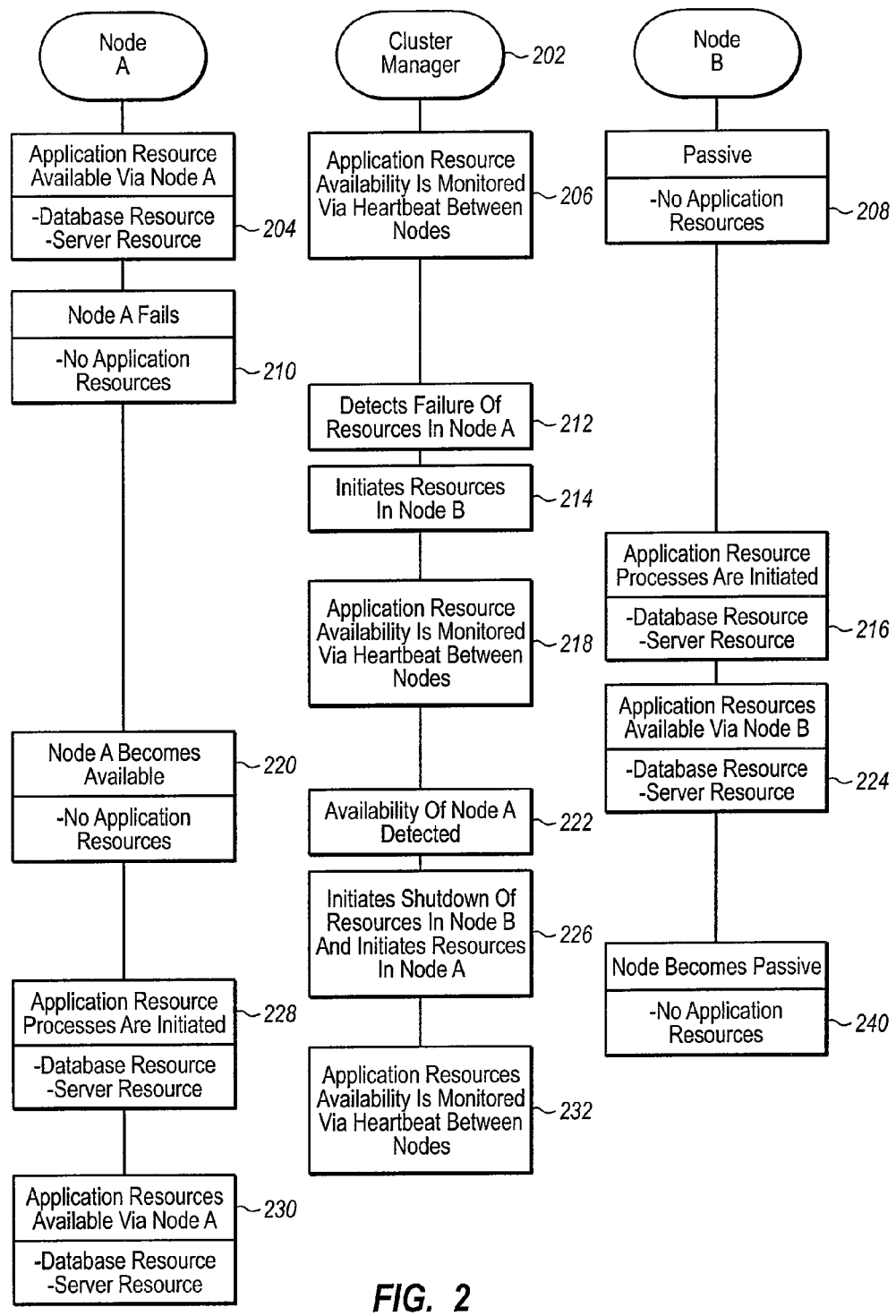
FIG. 2 illustrates an exemplary flow diagram of failover of a cluster unaware application following the failure of an active node.

Together with FIG. 1, FIG. 2 is a block diagram illustrating failover for an exemplary cluster unaware application in a networked environment. The networked environment may include, by way of example only, nodes 110A and 110B and a cluster manager 202. According to the illustrated example, the cluster unaware application has at least two application resources, listed as "database resource" and "server resource." The block diagram of FIG. 2 illustrates an example of the initiation and operation of the resources throughout the failover process.

Initially, both the application resources are available 204 via node 110A and the availability of the resources is monitored 206 by the cluster manager 202. Node 110B remains 208 passive. When node 110A fails 210, the application resources cease to be available in the network. This is detected 212 by the cluster manager 202 which initiates failover. Upon detecting 212 this failure, the cluster manager 202 initiates 214 the resource processes in node 110B. Next, the two resource processes of this example are initiated 216 on node 110B and the cluster unaware application continues 224 to be available via node 110B. The cluster manager 202 continues to monitor the availability 218 of the resources.

When node 110A becomes 220 available again, the cluster manager 202 detects 222 the availability of the node 110A and initiates 226 the application resource processes in node 110A. In order to prevent corruption of the shared storage 140, the cluster manager also initiates shutdown of the resources in node 110B. After the application resource processes are 228 initiated, the application resources are once again available 230 via node 110A. The cluster manager 202 continues 232 monitoring the application resources using heartbeats between the nodes 110A and 110B, and node 110B is passive 240.

Figure 3:
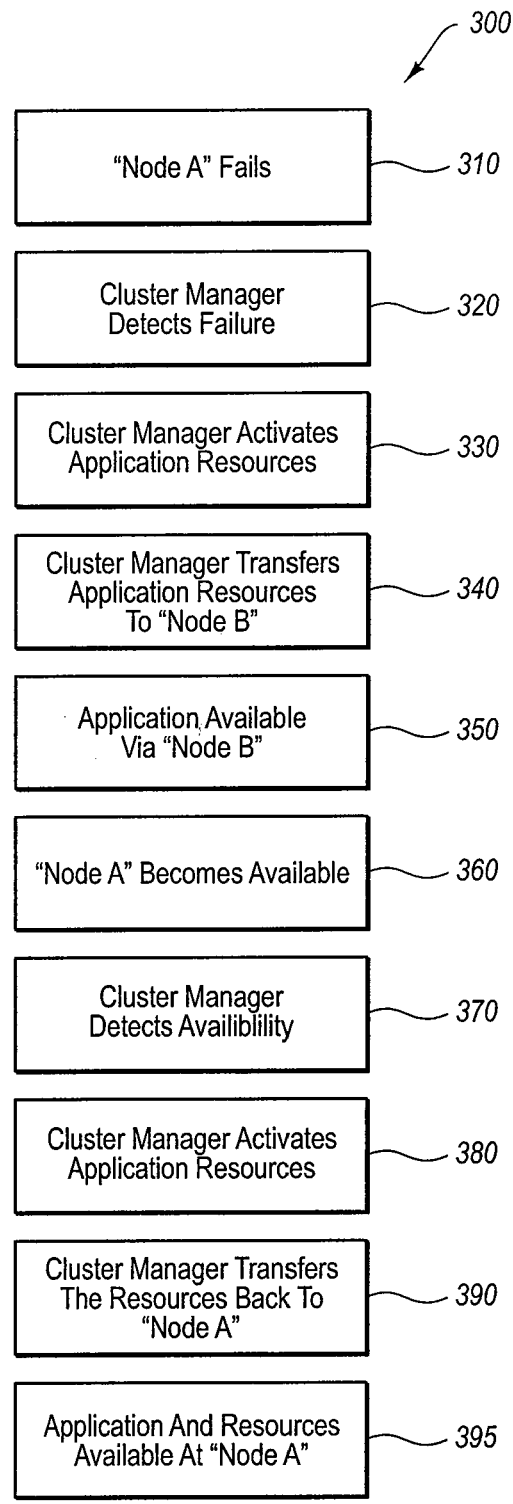
FIG. 3 illustrates an example of a flow diagram for failover following a failed node.

Together with FIGS. 1 and 2, FIG. 3 is a diagram illustrating successful failover in a cluster for a cluster-unaware application upon failure of the active node 110A in the cluster. At the initiation of failover, node 110A fails 310 or a failure of another type is detected. Next, the cluster manager monitors the heartbeats of each node in the cluster via the communication channel 115 and detects 320 that node 110A is no longer available. The cluster manager initiates failover.

Next, the cluster manager activates 330 the application resources identified during the application configuration process using the key registry. Then the cluster manager transfers 340 the resources to the node 110B. After the transfer 340, the application continues 350 to be available to cluster clients through node 110B, until at the node 110A becomes 360 available again. Alternatively, the node 110B assumes the active role and the node 110A becomes a passive node.

Next, the cluster manager detects 370 the restart or renewed availability of node 110A. After detecting 370 the availability of node 110A, the cluster manager again activates 380 the application resources identified during the application configuration process, and transfers 390 the resources back to node 110A. Finally, the application and resources are 390 available at node 110A.

Figure 4:
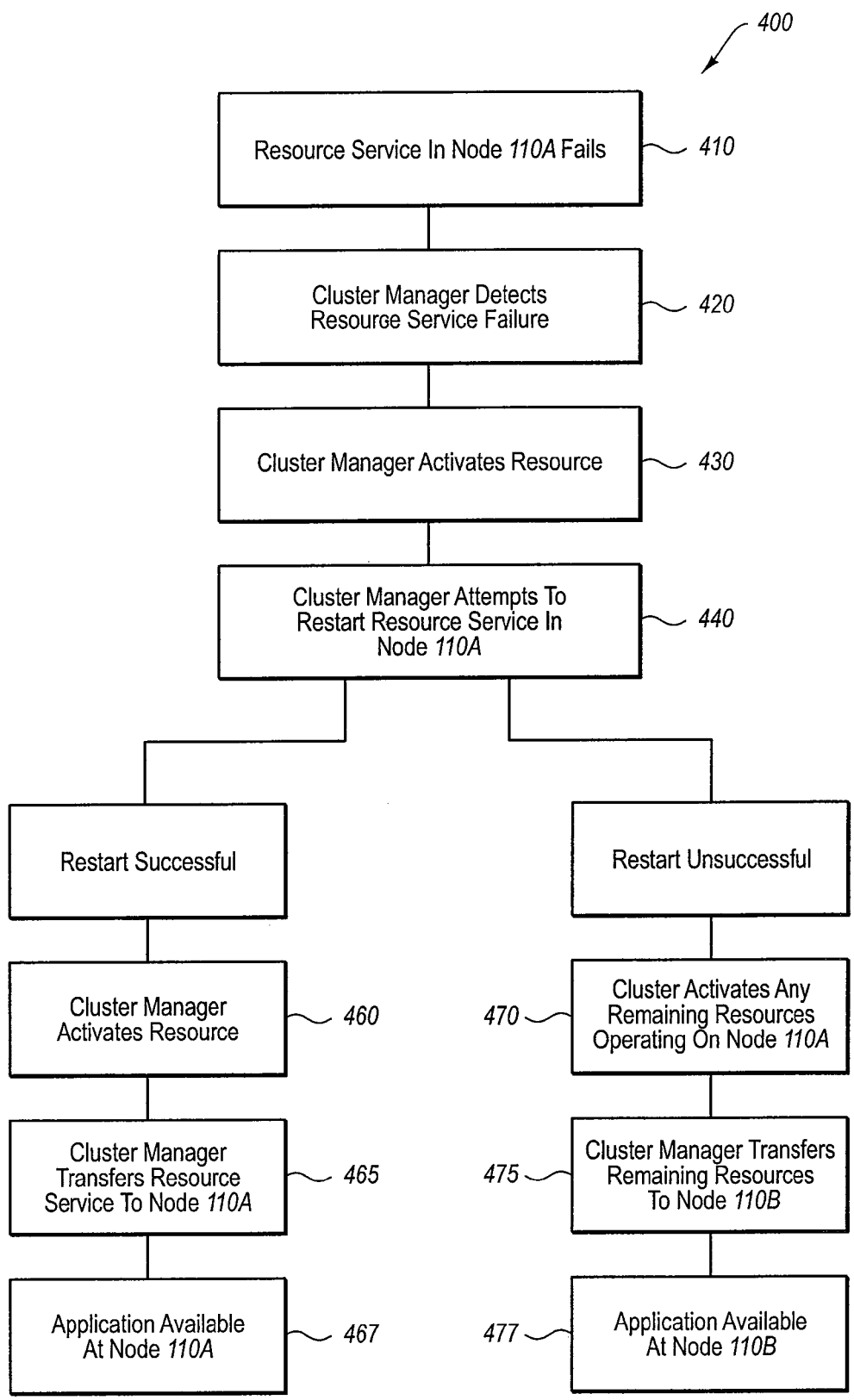
FIG. 4 illustrates another example of a flow diagram of failover following a failed application resource within a node.

Together with FIG. 1, FIG. 4 illustrates one embodiment of successful failover of a single application resource operating in the active node 110A. First, the resource service in node 110A fails 410. Next, the cluster manager detects 420 that the service is no longer available in node 110A via the cluster communication 115. After detecting 420 the failure, the cluster manager activates 430 the application resource. Next, the cluster manager attempts 440 to restart the application resource service on node 110A. If the application resource service successfully restarts on node 110A, then the cluster manager activates 460 the application resource service, and transfers 465 the application resource service to node 110A. Finally, after restoring the application resource service to node 110A, the application continues to be available 467 at node 110A.

Alternatively, if the cluster manager unsuccessfully attempts to restart the application resource service on node 110A after one or more tries, the cluster manager initiates a failover of the remaining application resources. The cluster manager activates 470 any remaining application resource services operating on node 110A. Then the cluster manager transfers 475 the remaining application resources to node 110B, where the application continues to be 477 available.

Figure 5:
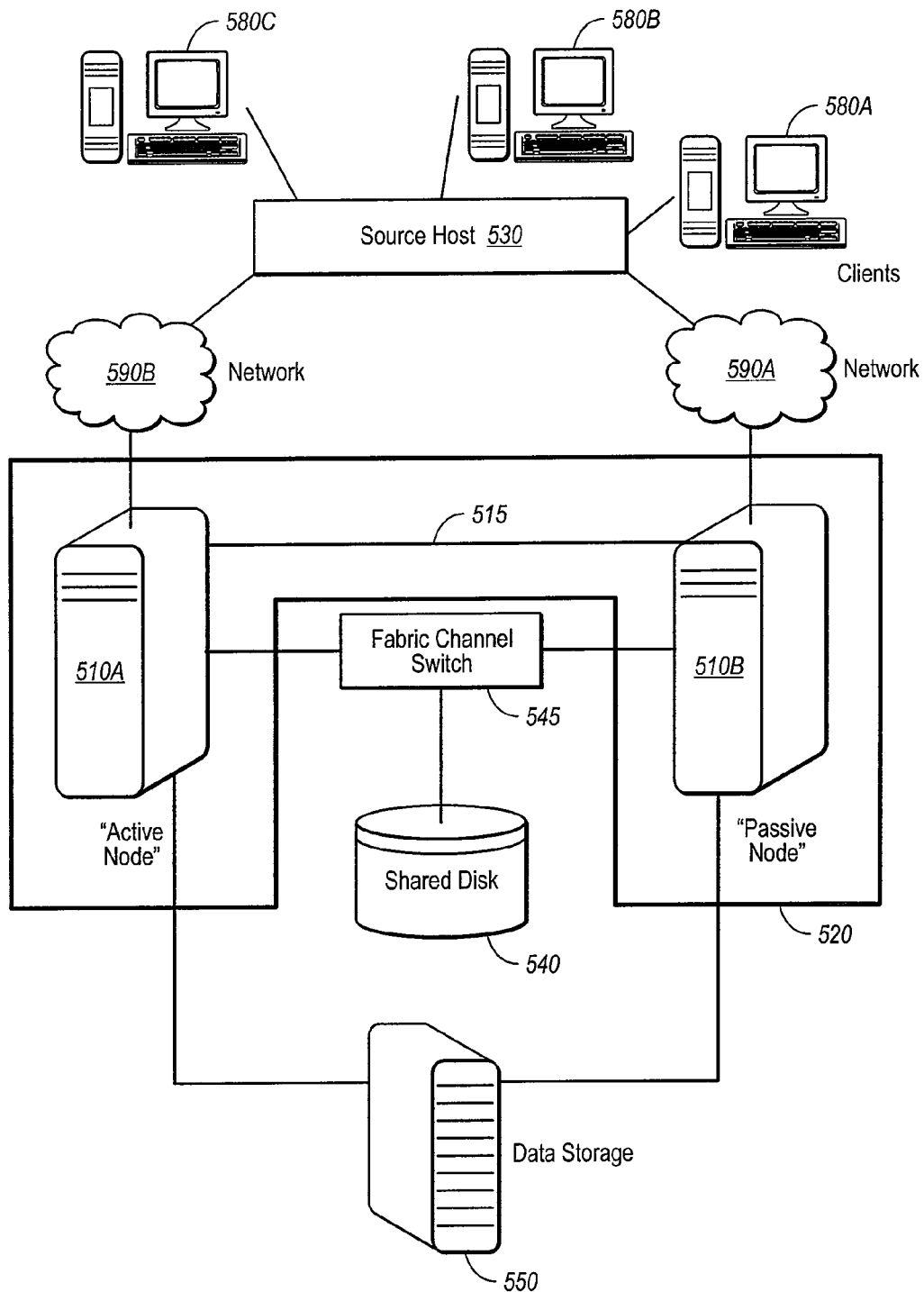
FIG. 5 illustrates an example of a clustered environment capable of performing failover for cluster unaware applications.

FIG. 5 is an exemplary configuration of a cluster capable of failover. The cluster 520 is connected to a series of clients 580A-C through a source host 530. The source host is connected to the cluster 420 through two public NIC connections 580A and 590B. The cluster 520 includes two nodes, including an active node 510A and a passive node 510B, which are connected using a private crossover cables between redundant NICs 515. A fabric channel switch 545 is connected the nodes 510A and 510B and is also attached to a shared disk 540. Finally, each node 510A and 510B is attached to a data storage device 550.

The computer system illustrated in FIG. 5 provides an exemplary configuration for use in a data migration system where a software application such as EMC DiskXtender. FIG. 5 illustrates only one example of a suitable computer system and is not intended to limit the scope or terms of the present invention in any way. Further, and one of ordinary skill in the art would recognize that the configuration may be utilized for operating any number of software applications in a clustered environment. Other configurations can also be used where failover for a cluster unaware application is possible. The following table lists the specific hardware and software configuration for the cluster 520 illustrated in FIG. 5. One of skill in the art can generate additional embodiments with the benefit of the disclosure.

| Component | Hardware | Software |
| --- | --- | --- |
| Active Node 510A and Passive Node 510B | Dell PowerEdge 850 with Duel GiGE NICs QLogic QLA 2200 HBA | Windows 2003 Enterprise Edition with Service Pack 1 Cluster software Navisphere Host Agent CLI 6.19.1.3.0 |
| Source Host 530 | Celerra NS500 | Celerra 5.5 |
| Fibre Channel switch 545 | EMC DS-16b fabric channel switch | Fashion operating system version 2.6.0f |
| Shared Disk 540 | CLARiiON AX100SC | FLARE operation system, version 02.19.100.5.007 |
| Data Storage 550 | Centera | CenteraStar version 3.0.0-542-557-8615 |

Figure 6:
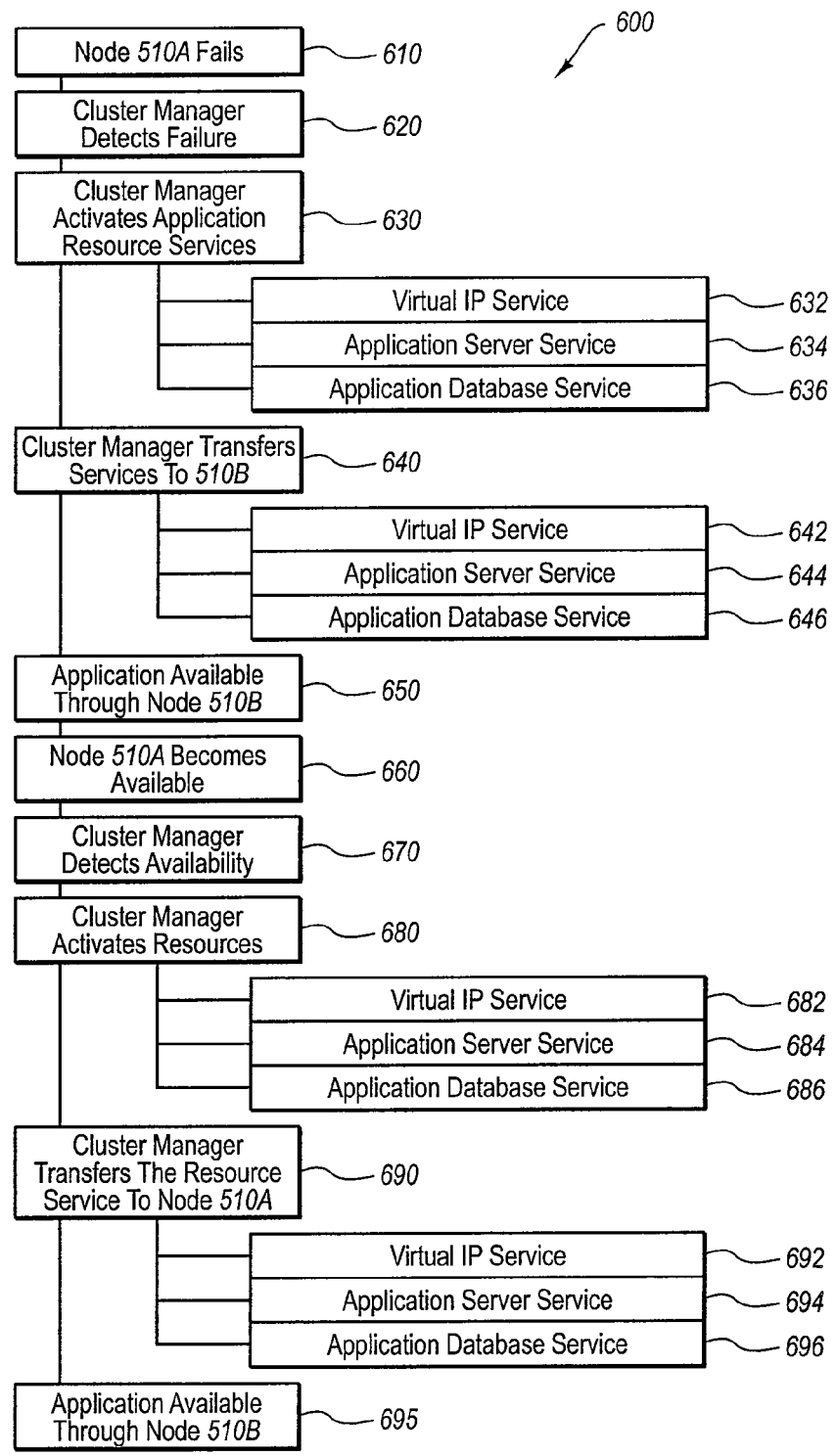
FIG. 6 illustrates a flow diagram of one embodiment of failover for a failed node within a data management application.
Figure 7:
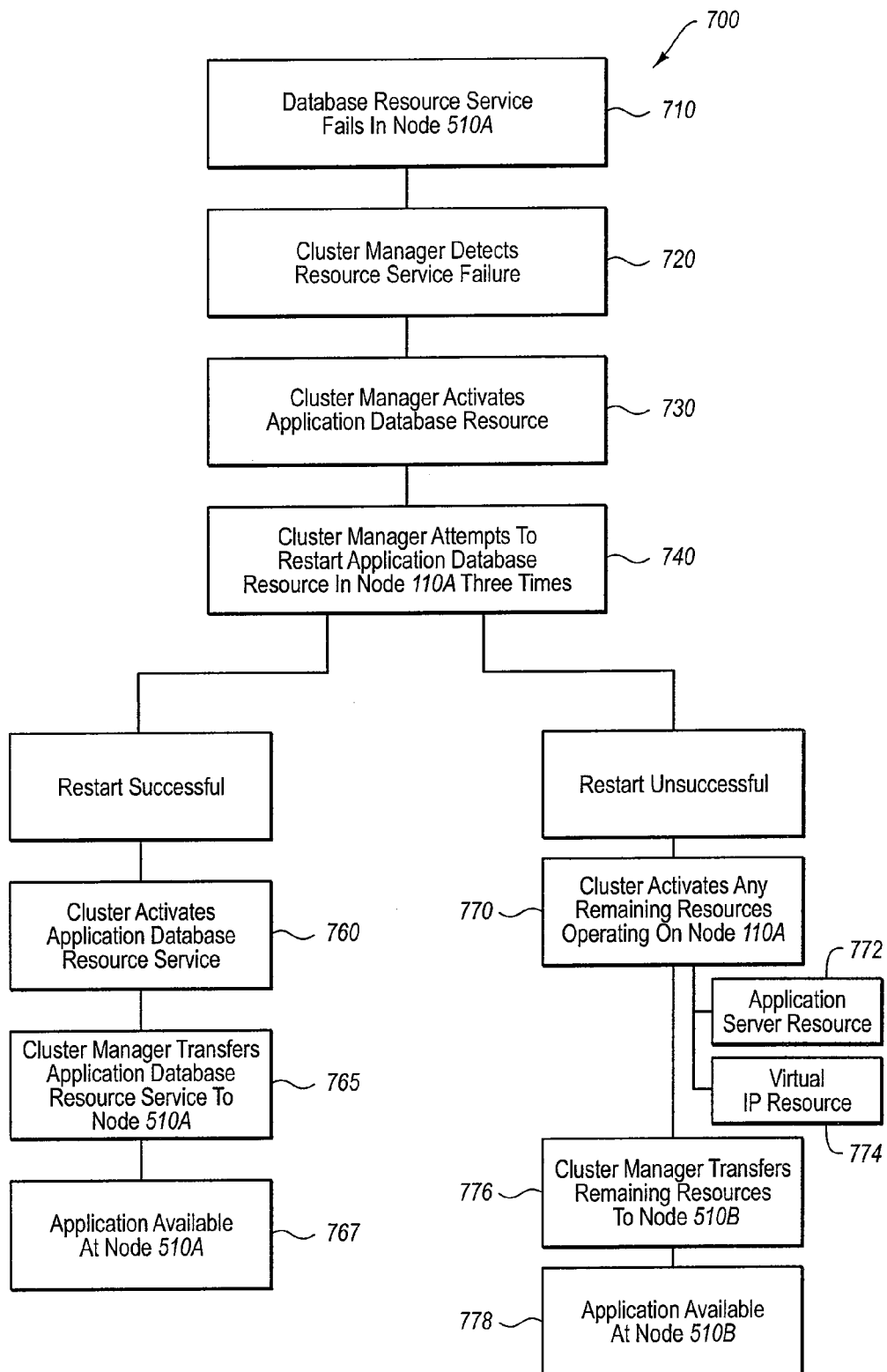
FIG. 7 illustrates a flow diagram of one embodiment of failover for a failed application resource within a data management application.

FIGS. 6-7 illustrate an exemplary failover process in an exemplary cluster-unaware application in the computer system illustrated in FIG. 5. According to one embodiment of the present invention, the cluster unaware application is EMC DiskXtender for NAS, ("DX-NAS"). DX-NAS is a networking solution that migrates inactive files from network clients 580A-C to a data storage device 550 and retrieves the archived data when requested. DX-NAS may be a cluster unaware application in some embodiments that may require configuration according to the present invention to provide high availability and failover in a cluster.

FIG. 6 illustrates one embodiment of a method 600 for performing failover in a clustered environment for an exemplary cluster unaware application. Failover begins when node 510A fails 310. Next, the cluster manager detects 620 the failure of the node 510A via the private NIC 515. The cluster manager monitors the heartbeats of each node in the cluster via the communication channel, detects that node 510A is no longer available, and initiates failover.

During failover the cluster manager activates 630 the application resource services identified during the application configuration process using the key registry. Within one exemplary cluster unaware application there are three application resource services that are activated, the Virtual IP service 532, the Application Server service 534, and the Application Database service 536. The cluster manager transfers each of these resources (642, 644, and 646, respectively) to the node 510B. Next, the application continues to be available to cluster clients through node 510B, until the node 510A is becomes 660 available again.

After node 510A becomes 660 available, the cluster manager detects 670 the restart or renewed availability of node 510A. Then cluster manager again activates 680 the Virtual IP service 682, the Application Server Service 684, and the Application Database Service 686. Then the cluster manager transfers 690 the resources (692, 694, and 696, respectively) back to node 510A. Finally, the application and resources are available 695 at node 510A.

Together with FIG. 5, FIG. 7 is a chart illustrating one embodiment of successful failover 700 of a single exemplary application resource operating in the active node 510A. In this example, the Application Database Resource is shown as failing over. This is intended to be illustrative only and one skilled in the art would understand that the process would be similar for any application resource.

First, the Application Database resource service in node 510A fails 710. After the failure 710, the cluster manager detects 720 that the Application Database service is no longer available in node 510A via the private NIC 515. Next the cluster manager activates 730 the Application Database Resource. Next, the cluster manager attempts 750 to restart the Application Database resource service on node 510A. If the Application Database service successfully restarts on node 510A, then the cluster manager activates 760 the Application Database resource, and transfers 765 the application resource service 365 back to node 510A. Finally, after restoring the Application Database service to node 510A, the application continues to be 767 available at node.

Alternatively, if the cluster manager unsuccessfully attempts to restart 740 the application resource service on node 510A several times, the cluster manager initiates a failover of the remaining application resources. The cluster manager activates 770 the two remaining application resource services operating on node 510, namely the exemplary Application Server Resource 772 and the Virtual IP resource 774. Then the cluster manager transfers 776 these resources to node 510B, where the application continues to be 778 available.

Embodiments described herein may include the user of a special purpose or general-purpose computer including various computer hardware or software modules, as discussed in greater detail below.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form computer-executable instructions or data structures and which can be accessed by a general purpose or special purpose computer. When information is transferred or provided over a network or another communication connection (either hardwired, wireless, or a combination or hardwired or wireless) to a computer, the computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special processing device to perform a certain function or group of functions. Although the subject matter has been described in language specific to structural features and/or methodological acts, it is to be understood that the subject matter defined in the appending claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a clustered environment that processes an application, the clustered environment including a shared disk connected with at least two nodes, a method of failover for a cluster unaware application in the clustered environment in the event of an node failure, the method comprising:
    identifying a failure of a first node using a cluster manager, wherein the first node provides application resources to a cluster unaware application and wherein a configuration of the first node includes a key registry that identifies each process of the cluster unaware application to the cluster manager;
    identifying the key registry for each process of the cluster unaware application;
    activating application resources for the cluster unaware application from the shared disk;
    protecting the shared disk from corruption during failover;
    transferring the application resources to a second node; and
    processing the application from the second node.

2. The method of claim 1, wherein the application resources comprises a Virtual IP resource, a database resource, and a server resource.

3. The method of claim 1, wherein the cluster unaware application comprises a software program capable of utilizing failover for a highly available data migration service.

4. The method of claim 1, wherein identifying a failure of a first node further comprises identifying a failure of at least one application resource.

5. The method of claim 4, further comprising attempting to restart the failed application resources.

6. The method of claim 1, wherein identifying a failure of a first node further comprises the second node failing to receive a "heartbeat" from the first node.

7. The method of claim 1, further comprising attempting to restart the failed first node.

8. The method of claim 1, further comprising configuring the first node and the second node to enable failover of the cluster unaware application.

9. The method of claim 8, wherein configuring the first node and the second node further comprises configuring the first node while the second node is placed in shutdown mode and configuring the second node while the first node is placed in shutdown mode.

10. The method of claim 8, wherein configuring the first node and the second node further comprises, for each of the first and second node:
    creating a first application resource;
    naming the first application resource;
    defining properties for the first application resource; and
    listing preferred owners for the first application resource, the owners including at least the first and second node.

11. The method of claim 10, wherein the application resources include the first application resource, the first application resource including one or more of a virtual IP resource, a database resource, and an application server resource.

12. A method of failover for a cluster unaware application in a clustered environment comprised of a shared disk and at least a first node where the application is preferably processed, and a second node capable of processing the application in the event of a first node failure, the method comprising:
    configuring a first node and a second node in a clustered environment for a cluster unaware application to enable failover of the cluster unaware application, wherein a configuration of the first node and the second node includes a key registry;
    identifying a failure of the first node using a cluster manager, wherein application resources are associated with a cluster unaware application operating on the first node; and
    failing over the cluster application to the second node by performing:
        identifying the key registry for each process of the cluster unaware application;
        activating application resources from a shared disk connected to the first node and to the second node using the key registry;
        protecting the shared disk from corruption during failover;
        transferring the application resources to the second node; and
        processing the application from the second node.

13. The method of claim 12, wherein the application resources comprise one or more of a virtual IP resource, a database resource, or a server resource.

14. The method of claim 12, wherein the application is a software program capable of utilizing failover for a highly available data migration service.

15. The method of claim 14, wherein identifying a failure of the first node comprises identifying a failure of at least one application resource.

16. The method of claim 12, wherein configuring a first node and a second node further comprises:
configuring the first node while the second node is placed in a shutdown mode and configuring the second node while the first node is placed in a shutdown mode; and
for each of the first and second node:
creating a first application resource;
naming the first application resource;
defining properties for the first application resource; and
listing preferred owners for the first application resource, the owners including at least the first and second node.

17. A method of failover for a cluster unaware application in a clustered environment comprised of a shared disk and at least two nodes referred to as an "active node" where the application is processed, and a "passive node" capable of processing the application in the event of a "active node" failure, the method comprising:
identifying active node failures using a cluster manager, wherein a cluster unaware application is processing through the active node and wherein the cluster unaware application is associated with application resources that have been previously configured on each node in the cluster for the cluster unaware application, wherein a configuration of each node includes a key registry;
activating the application resources from the shared disk, wherein the passive node is able to recognize the cluster unaware application based on the previous configuration of each node by identifying the key registry for each process of the cluster unaware application;
protecting the shared disk from corruption during failover;
transferring the application resources to the passive node;
processing the cluster unaware application from the passive node;
detecting availability in the active node;
activating the application resources from the shared disk;
transferring the application resources back to the active node; and
processing the cluster aware application in the active node.

18. The method of claim 17, wherein the application resources comprise one or more of a Virtual IP resource, a database resource, and a server resource.

19. The method of claim 17, wherein the application is a software program capable of utilizing failover for a highly available data migration service.

20. The method of claim 17, wherein the active node failure comprises a failure of at least one application resource.

21. The method of claim 17, further comprising enabling each node to recognize the cluster unaware application using a key registry.

22. The method of claim 21, further comprising transferring the application resources to the passive mode using the key registry.

* * * * *